US012686245B2

(12) United States Patent
Kwon et al.

(10) Patent No.: US 12,686,245 B2
(45) Date of Patent: Jul. 21, 2026

(54) VEHICLE CONTROL APPARATUS AND METHOD THEREOF

(71) Applicants: Hyundai Motor Company, Seoul (KR); Kia Corporation, Seoul (KR)

(72) Inventors: Dong Ho Kwon, Yongin-si (KR); Hae Dong Youn, Incheon (KR); Da Won Jeong, Suwon-si (KR); June Kyu Park, Hwaseong-si (KR); Ju Ho Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 160 days.

(21) Appl. No.: 18/596,968

(22) Filed: Mar. 6, 2024

(65) Prior Publication Data

US 2025/0135836 A1 May 1, 2025

(30) Foreign Application Priority Data

Oct. 31, 2023 (KR) ........................ 10-2023-0148146

(51) Int. Cl.
B60H 1/00 (2006.01)
(52) U.S. Cl.
CPC ..... B60H 1/00764 (2013.01); B60H 1/00807 (2013.01)
(58) Field of Classification Search
CPC . B60H 1/00764; B60H 1/00807; B60H 1/008
See application file for complete search history.

(56) References Cited

U.S. PATENT DOCUMENTS

2014/0195111 A1* 7/2014 Klimesch ................. G01K 3/06
701/36

FOREIGN PATENT DOCUMENTS

| CN | 116512859 A | * | 8/2023 | ......... B60H 1/00807 |
| JP | 2000335222 A | * | 12/2000 | |
| JP | 2011214782 A | * | 10/2011 | |
| JP | 7107058 B2 | * | 7/2022 | |
| KR | 20190129588 A | * | 11/2019 | ......... B60H 1/00764 |
| WO | WO-2019146326 A1 | * | 8/2019 | ............... B60H 1/22 |

* cited by examiner

*Primary Examiner* — Hunter B Lonsberry
*Assistant Examiner* — Besufekad Lemma Tessema
(74) *Attorney, Agent, or Firm* — Slater Matsil, LLP

(57) ABSTRACT

An embodiment of a vehicle control apparatus includes an air conditioning device, a sensor device, a memory, and a controller. The vehicle control apparatus can identify at least one of a driving position of a host vehicle, a driving mode of the host vehicle, a driving speed of the host vehicle, an outdoor air temperature of the host vehicle, or any combination thereof, using the sensor device, identify whether the host vehicle enters a tunnel based on the driving position, and perform sensor data correction logic for controlling the air conditioning device based on at least one of whether the host vehicle enters the tunnel, the driving speed, an amount of change in the outdoor air temperature, the driving mode of the host vehicle, or any combination thereof.

20 Claims, 9 Drawing Sheets

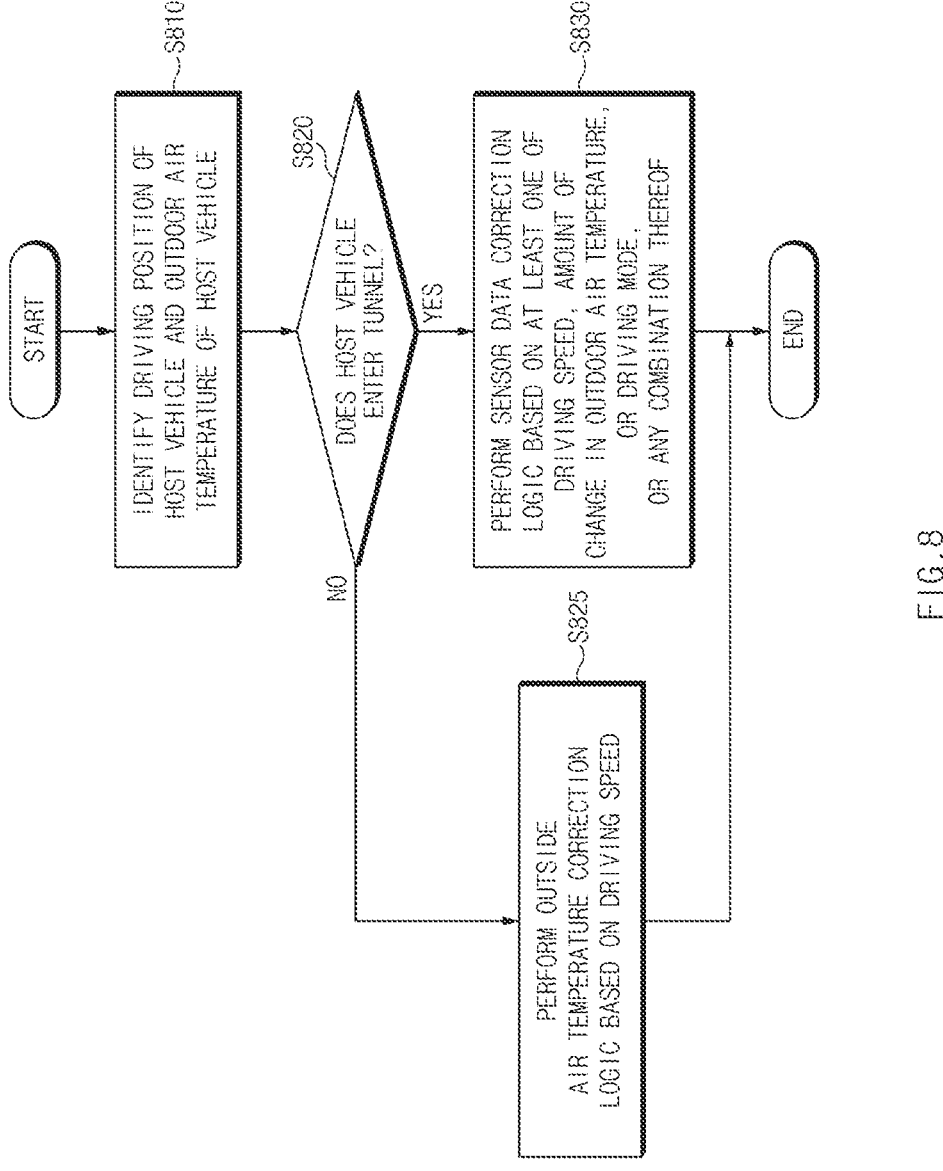

START

IDENTIFY DRIVING POSITION OF
HOST VEHICLE AND OUTDOOR AIR
TEMPERATURE OF HOST VEHICLE ~S810

DOES HOST VEHICLE
ENTER TUNNEL? ~S820

NO

YES

PERFORM SENSOR DATA CORRECTION
LOGIC BASED ON AT LEAST ONE OF
DRIVING SPEED, AMOUNT OF
CHANGE IN OUTDOOR AIR TEMPERATURE,
OR DRIVING MODE,
OR ANY COMBINATION THEREOF ~S830

PERFORM OUTSIDE
AIR TEMPERATURE CORRECTION
LOGIC BASED ON DRIVING SPEED ~S325

END

FIG.8

VEHICLE CONTROL APPARATUS AND METHOD THEREOF

CROSS-REFERENCE TO RELATED APPLICATIONS

This application claims the benefit of Korean Patent Application No. 10-2023-0148146, filed on Oct. 31, 2023, which application is hereby incorporated herein by reference.

TECHNICAL FIELD

The present disclosure relates to a vehicle control apparatus and a method thereof.

BACKGROUND

As technologies are developed, a user who rides in the vehicle may receive an air conditioning control function that adaptively varies based on an external environment, a driving condition of a vehicle, or the like.

For example, a vehicle control apparatus (or an air conditioning control device) loaded into the vehicle may adaptively control an air conditioning device including at least one air conditioning device, thus providing a user with a pleasant driving experience.

For example, the air conditioning device may include at least one air adjustment system for keeping the interior of the vehicle comfortable by use of a heating, ventilation, and air conditioning system in the interior of the vehicle under control of the vehicle control apparatus (or a controller).

Meanwhile, when the vehicle enters a driving section in which a temperature rapidly changes while driving, it may be somewhat difficult to identify the rapidly changed temperature in real time using only a predetermined sensing algorithm of a sensor device. For example, an outside air temperature sensor for sensing an external temperature of the vehicle is included in the sensor device. A speed at which the outside air temperature sensor identifies outside air temperature data in real time to correspond to a rapid change when there is the rapid change in the external temperature may be somewhat slow.

For example, when the vehicle enters a tunnel while driving, a difference between the outdoor air temperature identified by the sensor device and an actual outdoor air temperature of the vehicle may be somewhat large due to a difference between a temperature inside the tunnel and a temperature outside the tunnel. Meanwhile, data about an outdoor air temperature of the vehicle, which is detected using the sensor device, is one of important parameters to control the air conditioning device. When an error in such a parameter is large, the air conditioning device may fail to be smoothly controlled. In other words, it may be difficult to perform an adaptive air conditioning control function when the sensitivity of the sensor device in the situation in which the vehicle enters the tunnel is the same as the sensitivity of the sensor device in a general situation.

SUMMARY

The present disclosure relates to a vehicle control apparatus and a method thereof, and more particularly, relates to technologies of adaptively controlling the air conditioning of a host vehicle.

An embodiment of the present disclosure can solve the above-mentioned problems occurring in the prior art while advantages achieved by the prior art may be maintained intact.

An embodiment of the present disclosure provides a vehicle control apparatus for identifying a driving position of a host vehicle and performing sensor data correction logic for correcting sensor data for controlling an air conditioning device when identifying that the host vehicle enters a tunnel based on the driving position.

An embodiment of the present disclosure provides a vehicle control apparatus for operating a sensor device (or an outdoor air temperature sensor) for sensing an outdoor air temperature based on different sensitivity and/or different sensing periods (or update periods) depending on whether a driving speed of a host vehicle is greater than or equal to a specified speed.

An embodiment of the present disclosure provides a vehicle control apparatus for operating a sensor data acquisition algorithm with different criteria, based on whether a temperature of an environment in which a host vehicle is driving (or an outdoor air temperature) is increasing or decreasing.

An embodiment of the present disclosure provides a vehicle control apparatus for adjusting a control parameter for controlling an air conditioning device (e.g., a setting temperature, an amount of control for operating a heater, or an amount of control for operating a heat pump function), based on a type of a driving mode of a host vehicle to provide a user with a more adaptive air conditioning device control function.

Technical problems to be solved by an embodiment of the present disclosure are not necessarily limited to the aforementioned problems, and any other technical problems not mentioned herein can be clearly understood from the following description by those skilled in the art to which the present disclosure pertains.

According to an embodiment of the present disclosure, a vehicle control apparatus may include an air conditioning device, a sensor device, a memory storing instructions, and a controller operatively connected with the air conditioning device, the sensor device, and the memory. For example, the instructions may be configured to, when executed by the controller, cause the vehicle control apparatus to identify at least one of a driving position of a host vehicle, a driving mode of the host vehicle, a driving speed of the host vehicle, an outdoor air temperature of the host vehicle, or any combination thereof, using the sensor device, identify whether the host vehicle enters a tunnel based on the driving position, and perform sensor data correction logic for controlling the air conditioning device based on at least one of whether the host vehicle enters the tunnel, the driving speed, an amount of change in the outdoor air temperature, the driving mode of the host vehicle, or any combination thereof.

According to an embodiment, the instructions may be configured to, when executed by the controller, cause the vehicle control apparatus to identify whether the identified driving speed is greater than or equal to a specified speed, when identifying that the host vehicle is driving out of the tunnel based on the driving position, and, when the driving speed is greater than or equal to the specified speed, set sensitivity of the sensor device to a first degree and update sensing data for the outdoor air temperature every first time, when the outdoor air temperature is increasing, and set the sensitivity to the first degree and update the sensing data for the outdoor air temperature every second time smaller than the first time, when the outdoor air temperature is decreasing.

According to an embodiment, the instructions may be configured to, when executed by the controller, cause the vehicle control apparatus to identify whether the identified driving speed is greater than or equal to a specified speed, when identifying that the host vehicle is driving out of the tunnel based on the driving position, and, when the driving speed is less than the specified speed, identify an outdoor air temperature correction value for controlling the air conditioning device based on a first slope corresponding to an increasing speed of the outdoor air temperature, when the outdoor air temperature is increasing, and identify the outdoor air temperature correction value for controlling the air conditioning device based on a second slope corresponding to a decreasing speed of the outdoor air temperature, when the outdoor air temperature is decreasing.

According to an embodiment, an absolute value of the first slope may be set to be smaller than an absolute value of the second slope.

According to an embodiment, the instructions may be configured to, when executed by the controller, cause the vehicle control apparatus to identify whether the identified driving speed is greater than or equal to the specified speed, when identifying that the host vehicle enters the tunnel based on the driving position, and, when the driving speed is greater than or equal to the specified speed, set the sensitivity of the sensor device to a second degree greater than the first degree and update the sensing data for the outdoor air temperature every first time, when the outdoor air temperature is increasing, and set the sensitivity to the second degree and update the sensing data for the outdoor air temperature every second time smaller than the first time, when the outdoor air temperature is decreasing.

According to an embodiment, the instructions may be configured to, when executed by the controller, cause the vehicle control apparatus to, when the driving speed is greater than or equal to the specified speed continuously during a specified time, decrease a sampling rate about the outdoor air temperature, when the outdoor air temperature is increasing.

According to an embodiment, the instructions may be configured to, when executed by the controller, cause the vehicle control apparatus to identify whether the identified driving speed is greater than or equal to the specified speed, when identifying that the host vehicle enters the tunnel based on the driving position, and, when the driving speed is less than the specified speed, identify the outdoor air temperature correction value for controlling the air conditioning device based on a third slope corresponding to an increasing speed of the outdoor air temperature, when the outdoor air temperature is increasing, and identify the outdoor air temperature correction value for controlling the air conditioning device based on a fourth slope corresponding to a decreasing speed of the outdoor air temperature, when the outdoor air temperature is decreasing.

According to an embodiment, an absolute value of the third slope may be set to be greater than an absolute value of the first slope, and an absolute value of the fourth slope may be set to be greater than an absolute value of the second slope.

According to an embodiment, the instructions may be configured to, when executed by the controller, cause the vehicle control apparatus to, when identifying the driving mode of the host vehicle corresponds to a first mode, decrease a setting temperature for controlling the air conditioning device by a first value, when the outdoor air temperature is increasing, and increase the setting temperature for controlling the air conditioning device by a second value smaller than the first value, when the outdoor air temperature is decreasing.

According to an embodiment, the instructions may be configured to, when executed by the controller, cause the vehicle control apparatus to, when identifying the driving mode of the host vehicle corresponds to a second mode, decrease an amount of control for operating a heater included in the air conditioning device and increase an amount of control for operating a heat pump function for absorbing heat outside the host vehicle, when the outdoor air temperature is increasing or in equilibrium.

According to an embodiment of the present disclosure, a vehicle control method may include identifying, by a controller, at least one of a driving position of a host vehicle, a driving mode of the host vehicle, a driving speed of the host vehicle, an outdoor air temperature of the host vehicle, or any combination thereof, using a sensor device, identifying, by the controller, whether the host vehicle enters a tunnel based on the driving position, and performing, by the controller, sensor data correction logic for controlling an air conditioning device based on at least one of whether the host vehicle enters the tunnel, the driving speed, an amount of change in the outdoor air temperature, the driving mode of the host vehicle, or any combination thereof.

According to an embodiment, the performing of the sensor data correction logic by the controller may include identifying, by the controller, whether the identified driving speed is greater than or equal to a specified speed, when identifying that the host vehicle is driving out of the tunnel based on the driving position, and, when the driving speed is greater than or equal to the specified speed, setting, by the controller, sensitivity of the sensor device to a first degree and updating, by the controller, sensing data for the outdoor air temperature every first time, when the outdoor air temperature is increasing, and setting, by the controller, the sensitivity to the first degree and updating, by the controller, the sensing data for the outdoor air temperature every second time smaller than the first time, when the outdoor air temperature is decreasing.

According to an embodiment, the performing of the sensor data correction logic by the controller may include identifying, by the controller, whether the identified driving speed is greater than or equal to a specified speed, when identifying that the host vehicle is driving out of the tunnel based on the driving position, and, when the driving speed is less than the specified speed, identifying, by the controller, an outdoor air temperature correction value for controlling the air conditioning device based on a first slope corresponding to an increasing speed of the outdoor air temperature, when the outdoor air temperature is increasing, and identifying, by the controller, the outdoor air temperature correction value for controlling the air conditioning device based on a second slope corresponding to a decreasing speed of the outdoor air temperature, when the outdoor air temperature is decreasing.

According to an embodiment, an absolute value of the first slope may be set to be smaller than an absolute value of the second slope.

According to an embodiment, the performing of the sensor data correction logic by the controller may include identifying, by the controller, whether the identified driving speed is greater than or equal to the specified speed, when identifying that the host vehicle enters the tunnel based on the driving position, and, when the driving speed is greater than or equal to the specified speed, setting, by the controller, the sensitivity of the sensor device to a second degree greater than the first degree and updating, by the controller, the sensing data for the outdoor air temperature every first time, when the outdoor air temperature is increasing, and setting, by the controller, the sensitivity to the second degree and updating, by the controller, the sensing data for the outdoor air temperature every second time smaller than the first time, when the outdoor air temperature is decreasing.

According to an embodiment, the vehicle control method may further include, when the driving speed is greater than or equal to the specified speed continuously during a specified time, decreasing, by the controller, a sampling rate about the outdoor air temperature, when the outdoor air temperature is increasing.

According to an embodiment, the performing of the sensor data correction logic by the controller may include identifying, by the controller, whether the identified driving speed is greater than or equal to the specified speed, when identifying that the host vehicle enters the tunnel based on the driving position, and, when the driving speed is less than the specified speed, identifying, by the controller, the outdoor air temperature correction value for controlling the air conditioning device based on a third slope corresponding to an increasing speed of the outdoor air temperature, when the outdoor air temperature is increasing, and identifying, by the controller, the outdoor air temperature correction value for controlling the air conditioning device based on a fourth slope corresponding to a decreasing speed of the outdoor air temperature, when the outdoor air temperature is decreasing.

According to an embodiment, an absolute value of the third slope may be set to be greater than an absolute value of the first slope, and an absolute value of the fourth slope may be set to be greater than an absolute value of the second slope.

According to an embodiment, the vehicle control method may further include, when identifying, by the controller, the driving mode of the host vehicle corresponds to a first mode, decreasing, by the controller, a setting temperature for controlling the air conditioning device by a first value, when the outdoor air temperature is increasing, and increasing, by the controller, the setting temperature for controlling the air conditioning device by a second value smaller than the first value, when the outdoor air temperature is decreasing.

According to an embodiment, the vehicle control method may further include, when identifying the driving mode of the host vehicle corresponds to a second mode, decreasing, by the controller, an amount of control for operating a heater included in the air conditioning device and increasing, by the controller, an amount of control for operating a heat pump function for absorbing heat outside the host vehicle, when the outdoor air temperature is increasing or in equilibrium.

BRIEF DESCRIPTION OF THE DRAWINGS

The above and other features and advantages of the present disclosure can be more apparent from the following detailed description taken in conjunction with the accompanying drawings, in which:

FIG. 8 is a flowchart of a vehicle control method according to an embodiment of the present disclosure.

With regard to description of drawings, same or similar denotations may be used for same or similar components.

DETAILED DESCRIPTION OF ILLUSTRATIVE EMBODIMENTS

Hereinafter, some embodiments of the present disclosure will be described in detail with reference to the example drawings. In addition, a detailed description of well-known features or functions can be omitted to not unnecessarily obscure the gist of the present disclosure.

In describing components of an embodiment according to the present disclosure, terms such as "first," "second," "A", "B", "(a)," "(b)," and the like may be used. These terms can be merely used to distinguish one element from another element, but do not necessarily limit the corresponding elements irrespective of the order or priority of the corresponding elements. Furthermore, unless otherwise defined, all terms including technical and scientific terms used herein can have the same meaning as being generally understood by those skilled in the art to which the present disclosure pertains. Such terms as those defined in a generally used dictionary can be interpreted as having meanings equal to the contextual meanings in the relevant field of art.

Hereinafter, embodiments of the present disclosure will be described in detail with reference to FIGS. 1 to 9.

Figure 1:
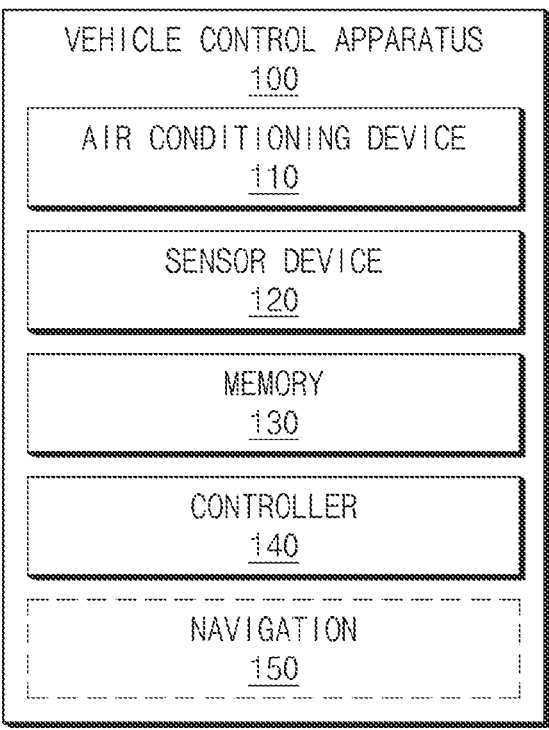
FIG. 1 is a block diagram illustrating components of a vehicle control apparatus according to an embodiment of the present disclosure.

FIG. 1 is a block diagram illustrating components of a vehicle control apparatus according to an embodiment of the present disclosure.

According to an embodiment, a vehicle control apparatus 100 may include at least one of an air conditioning device 110, a sensor device 120, a memory 130, a controller 140, navigation 150, or any combination thereof. The components of the vehicle control apparatus 100, which are shown in FIG. 1, are illustrative, and embodiments of the present disclosure are not necessarily limited thereto. For example, the vehicle control apparatus 100 may further include components (e.g., an interface, a display, a notification device, a communication device, or any combination thereof) which are not shown in FIG. 1.

According to an embodiment, the air conditioning device 110 may include at least one air conditioning device for adjusting an air conditioning environment in a host vehicle.

For example, the air conditioning device 110 may include at least one air adjustment system for keeping the interior of the vehicle comfortable by using a heating, ventilation, and air conditioning system in the interior of the vehicle under control of the vehicle control apparatus 100 (or the controller 140).

For example, the air conditioning device 110 may include at least one of a heater, an air conditioner, an air purifier, a door opening and closing device, or any combination thereof.

According to an embodiment, the sensor device 120 may obtain (or identify) various pieces of information required to control the host vehicle.

For example, the sensor device 120 may include at least one sensor including at least one of a camera, radio detection and ranging (RADAR), light detection and ranging (Li-DAR), or any combination thereof.

As an example, the sensor device 120 may include at least one sensor necessary to control driving of the host vehicle. The controller 140 may obtain, for example, pieces of information about an environment around the host vehicle using the sensor device 120.

For example, the sensor device 120 may include a temperature sensor (or an outdoor air temperature sensor).

As an example, the sensor device 120 may include at least one temperature sensor configured to identify an internal temperature and/or an external temperature of the host vehicle. The controller 140 may obtain, for example, pieces of information about an internal temperature and/or an external (or outdoor air) temperature of the host vehicle using the sensor device 120.

According to an embodiment, the memory 130 may store a command, code, data, or any combination thereof. For example, the memory 130 may store code including one or more instructions, when executed by the controller 140, causing the vehicle control apparatus 100 to perform various operations.

For example, the memory 130 and the controller 140 may be implemented as one chipset. The controller 140 may include at least one of a communication processor or a modem.

For example, the memory 130 may store various pieces of information associated with the vehicle control apparatus 100. As an example, the memory 130 may store information about an operation history of the controller 140. As an example, the memory 130 may store information associated with states and/or operations of components (e.g., at least one of an engine control unit (ECU), the sensor device 120, the controller 140, the navigation 150, or any combination thereof) of the host vehicle.

According to an embodiment, the controller 140 may be operatively connected with at least one of the air conditioning device 110, the sensor device 120, the memory 130, the navigation 150, or a combination thereof. For example, the controller 140 may control an operation of at least one of the air conditioning device 110, the sensor device 120, the memory 130, the navigation 150, or a combination thereof.

For example, the controller 140 may identify at least one of a driving position of the host vehicle, a driving mode of the host vehicle, a driving speed of the host vehicle, an outdoor air temperature of the host vehicle, or any combination thereof, using the sensor device 120.

As an example, the controller 140 may identify a driving position while the host vehicle is driving. As an example, the controller 140 may obtain pieces of information about a driving position and/or a driving section while the host vehicle is driving, further using the navigation 150.

As an example, the controller 140 may identify a driving mode of the host vehicle. The driving mode may include at least one of, for example, a normal driving mode, a high-speed driving mode (or a sports mode), an eco mode, a heating mode, or any combination thereof. The normal driving mode may include, for example, a driving mode set under a normal driving environment. The high-speed driving mode may include, for example, a driving mode set in a high-speed driving possible section such as a highway. The eco mode may include, for example, a driving mode in which power for driving is set to be smaller than the normal driving mode or the high-speed driving mode based on a user setting to drive. The heating mode may include, for example, a driving mode capable of performing a heat pump function for collecting (or absorbing) an outdoor air temperature for heating the interior of the host vehicle, when the outdoor air temperature is greater than an internal temperature of the host vehicle or is increasing.

As an example, the controller 140 may identify a driving speed of the host vehicle. The controller 140 may continuously monitor a real-time driving speed identified while the host vehicle is driving.

As an example, the controller 140 may identify an outdoor air temperature of the host vehicle. The controller 140 may identify, for example, a temperature (or an outdoor air temperature) of an area while the host vehicle is driving in real time, using at least one device (e.g., an outdoor air temperature sensor) included in the sensor device 120. At this time, the controller 140 may differently set outdoor air temperature identification logic using the sensor device 120 depending on the driving position of the host vehicle and may control the air conditioning device 110. A description will be given in detail below of the outdoor air temperature identification logic of the controller 140.

For example, the controller 140 may identify whether the host vehicle enters a tunnel based on the driving position.

As an example, the controller 140 may obtain information about at least one of whether the host vehicle enters the tunnel, a distance at which the host vehicle is spaced apart from the tunnel, a length of the tunnel, an estimated time to pass through the tunnel, or any combination thereof.

For example, the controller 140 may perform sensor data correction logic for controlling the air conditioning device 110 based on at least one of whether the host vehicle enters the tunnel, the driving speed, an amount of change in outdoor air temperature, the driving mode of the host vehicle, or any combination thereof.

As an example, when identifying that the host vehicle drives out of the tunnel based on the driving position, the controller 140 may identify whether the identified driving speed is greater than or equal to a specified speed. When the driving speed is greater than or equal to the specified speed (e.g., 20 km/h to 30 km/h), the controller 140 may identify whether the outdoor air temperature is increasing or decreasing. For example, the controller 140 may set sensitivity of the sensor device 120 to a first degree and may update sensing data for the outdoor air temperature every first time, when the outdoor air temperature is increasing, and may set the sensitivity to the first degree and may update the sensing data for the outdoor air temperature every second time smaller than the first time, when the outdoor air temperature is decreasing. In other words, when the driving speed is greater than or equal to the specified speed in a normal situation in which the host vehicle is driving out of the tunnel (or when it is identified as a high-speed situation), the controller 140 may set an update period of sensor data obtained by use of the sensor device 120 to be shorter when the outdoor air temperature is decreasing than when the outdoor air temperature is increasing. As a result, the controller 140 may more quickly update the sensor data when the temperature is decreasing to control the sensor device 120, such that the outdoor air temperature obtained by the sensor device 120 more accurately follows an actual outdoor air temperature.

As an example, when identifying that the host vehicle drives out of the tunnel based on the driving position, the controller 140 may identify whether the identified driving speed is greater than or equal to the specified speed. For example, when the driving speed is less than the specified speed, the controller 140 may identify whether the outdoor air temperature is increasing or decreasing. For example, the controller 140 may identify an outdoor air temperature correction value for controlling the air conditioning device 110 based on a first slope corresponding to an increasing speed of the outdoor air temperature, when the outdoor air temperature is increasing, and may identify an outdoor air temperature correction value for controlling the air conditioning device 110 based on a second slope corresponding to a decreasing speed of the outdoor air temperature, when the outdoor air temperature is decreasing. For example, an absolute value of the first slope may be set to be smaller than an absolute value of the second slope. In other words, when the driving speed is less than the specified speed in the normal situation in which the host vehicle is driving out of the tunnel (or when it is identified as a low-speed situation), the controller 140 may be configured to identify a larger amount of change in the sensor data obtained by use of the sensor device 120 when the outdoor air temperature is decreasing than when the outdoor air temperature is increasing. As a result, the controller 140 may more quickly reflect a change speed of the outdoor air temperature in the correction value, when the temperature is decreasing, to control the sensor device 120, such that the outdoor air temperature obtained by the sensor device 120 more accurately follows an actual outdoor air temperature. The controller 140 may control the air conditioning device 110 based on the identified outdoor air temperature correction value.

As an example, when identifying that the host vehicle enters the tunnel based on the driving position, the controller 140 may identify whether the identified driving speed is greater than or equal to the specified speed. For example, when the driving speed is greater than or equal to the specified speed, the controller 140 may identify whether the outdoor air temperature is increasing or decreasing. For example, the controller 140 may set sensitivity of the sensor device 120 to a second degree greater than the first degree and may update sensing data for the outdoor air temperature every first time, when the outdoor air temperature is increasing, and may set the sensitivity to the second degree and may update the sensing data for the outdoor air temperature every second time smaller than the first time, when the outdoor air temperature is decreasing. In other words, when the driving speed is greater than or equal to the specified speed in the situation in which it is identified that the host vehicle enters the tunnel (or when it is identified as the high-speed situation), the controller 140 may set an update period of the sensor data obtained by means of the sensor device 120 to be shorter when the outdoor air temperature is decreasing than when the outdoor air temperature is increasing. In addition, the controller 140 may set the sensitivity of the sensor device 120 for obtaining sensor data to be higher (or larger) in the situation in which the host vehicle enters the tunnel (or in the situation in which the host vehicle drives in the tunnel) than in the situation in which the host vehicle drives out of the tunnel. As a result, the controller 140 may more quickly update the sensor data when the temperature is decreasing and may update the sensor data at higher sensitivity when the host vehicle enters the tunnel than when the host vehicle drives on a normal road outside the tunnel to control the sensor device 120, such that the outdoor air temperature obtained by the sensor device 120 more accurately follows an actual outdoor air temperature. A description of the sensitivity of the sensor device 120 will be given in detail below in a description of FIG. 4. The controller 140 may control the air conditioning device 110 based on the updated sensing data.

As an example, when identifying that the driving speed is greater than or equal to the specified speed continuously during a specified time (e.g., 1 minute) in the situation in which the host vehicle is driving in the tunnel and when the outdoor air temperature is increasing, the controller 140 may reduce a sampling rate about the outdoor air temperature. In other words, when the host vehicle travels in the tunnel at the specified speed or more during more than the specified time, when the specified speed is exceeded, the controller 140 may increase a sampling rate for sensor data (or an outdoor air temperature correction value) for identifying the outdoor air temperature, thus sampling relatively more data to identify the outdoor air temperature.

As an example, when identifying that the host vehicle enters the tunnel based on the driving position, the controller 140 may identify whether the identified driving speed is greater than or equal to the specified speed. For example, when the driving speed is less than the specified speed, the controller 140 may identify whether the outdoor air temperature is increasing or decreasing. For example, the controller 140 may identify an outdoor air temperature correction value for controlling the air conditioning device 110 based on a third slope corresponding to an increasing speed of the outdoor air temperature, when the outdoor air temperature is increasing, and may identify an outdoor air temperature correction value for controlling the air conditioning device 110 based on a fourth slope corresponding to a decreasing speed of the outdoor air temperature, when the outdoor air temperature is decreasing. For example, an absolute value of the third slope may be set to be greater than the absolute value of the first slope, and an absolute value of the fourth slope may be set to be greater than the absolute value of the second slope. In other words, when the driving speed is less than the specified speed in the situation in which it is identified that the host vehicle enters the tunnel (or when it is identified as the low-speed situation), the controller 140 may be configured to identify a larger amount of change in the sensor data obtained by use of the sensor device 120 when the outdoor air temperature is decreasing than when the outdoor air temperature is increasing. In addition, the controller 140 may adjust an operation parameter of the sensor device 120 to reflect a larger change speed of the sensor data (or the outdoor air temperature) in the situation in which the host vehicle enters the tunnel (or in the situation in which the host vehicle drives in the tunnel) than in the situation in which the host vehicle drives out of the tunnel. As a result, the controller 140 may more quickly reflect a change speed of the outdoor air temperature in the correction value when the temperature is decreasing and more quickly reflect an amount of change in sensor data when the host vehicle enters the tunnel than when the host vehicle drives on the normal road outside the tunnel to control the sensor device 120, such that the outdoor air temperature obtained by the sensor device 120 more accurately follows the actual outdoor air temperature. The controller 140 may control the air conditioning device 110 based on the identified outdoor air temperature correction value.

For example, the controller 140 may perform an additional function for controlling the air conditioning device 110 based on the driving mode of the host vehicle.

As an example, when identifying that the driving mode of the host vehicle corresponds to the first mode (e.g., the eco mode), the controller 140 may decrease a setting temperature for controlling the air conditioning device 110 by a first value, when the outdoor air temperature is increasing, and may increase the setting temperature for controlling the air conditioning device 110 by a second value smaller than the first value, when the outdoor air temperature is decreasing. In other words, when the driving mode is the first mode, to minimize power required to control the host vehicle, the controller 140 may decrease a setting temperature, which is one of operation parameters of the air conditioning device 110, by the first value, when the outdoor air temperature is increasing, and may increase the setting temperature by the second value, when the outdoor air temperature is decreasing, thus decreasing power required to operate the air conditioning device 110.

As an example, when identifying that the driving mode of the host vehicle corresponds to the second mode (e.g., the heating mode) and when the outdoor air temperature is increasing or in equilibrium, the controller 140 may decrease an amount of control for operating a heater included in the air conditioning device 110 and may increase an amount of control for operating a heat pump function for absorbing heat outside the host vehicle. In other words, when the host vehicle enters the tunnel in a situation, such as winter, in which the inside of the tunnel is warmer than the outside of the tunnel, the controller 140 may accelerate the operation of the heat pump function for temporarily collecting heat in the tunnel using the heat pump function, thus decreasing an amount of control for operating the heater to minimize an amount of power for air conditioning control.

According to an embodiment, the navigation 150 may obtain (or identify) information about the position at which the host vehicle is driving.

For example, the navigation 150 in FIG. 1 is shown as one independent configuration, but can be implemented as one component of the sensor device 120.

For example, the navigation 150 may include a communication device. The controller 140 may receive information about the position at which the host vehicle is driving from the outside through the navigation 150.

The components of the vehicle control apparatus 100, which are shown in FIG. 1, are illustrative, and embodiments of the present disclosure are not necessarily limited thereto. Furthermore, limits to the numerical values in the above-mentioned description of FIG. 1 are illustrative, which may be understood as random values changeable by a setting of a user and/or a developer.

Figure 2:
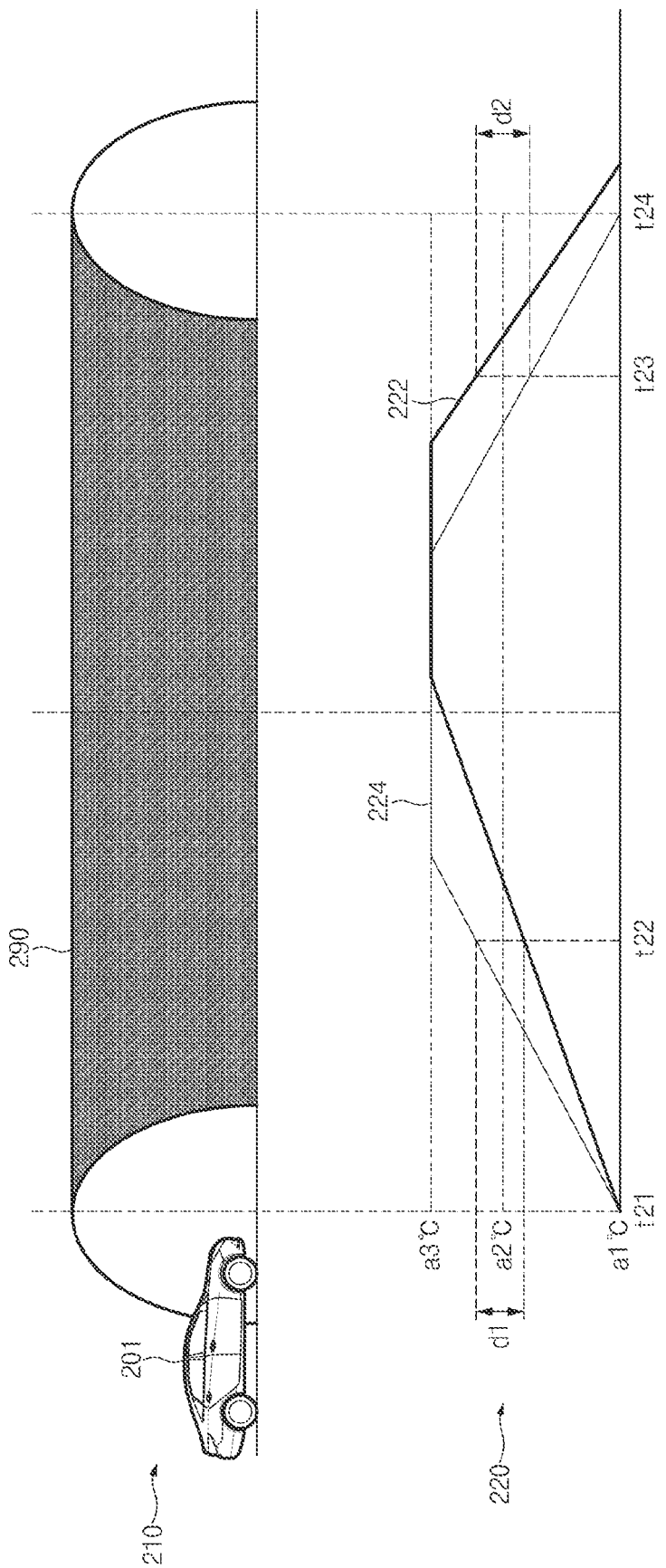
FIG. 2 is an operational conceptual diagram of a vehicle control method according to an embodiment of the present disclosure.

FIG. 2 is an operational conceptual diagram of a vehicle control method according to an embodiment of the present disclosure.

For reference, conceptual diagrams of FIGS. 2 to 5 may be described on the assumption that the inside of the tunnel is relative higher in temperature than the outside of the tunnel, but this is illustrative. Embodiments of the present disclosure are not necessarily limited thereto.

According to an embodiment, a vehicle control apparatus (e.g., a vehicle control apparatus 100 of FIG. 1) may control an air conditioning device (e.g., an air conditioning device 110 of FIG. 1) based on external information (e.g., an outdoor air temperature) of a host vehicle 201.

Referring to reference numerals 210 and 220, according to an embodiment, the host vehicle 201 may enter a tunnel 290 at a first time point t21.

For example, reference numeral 222 is a graph illustrating an outdoor air temperature obtained using a sensor device by a vehicle control apparatus, and reference numeral 224 may be a graph illustrating an actual temperature in a tunnel.

For example, while the host vehicle 201 enters the tunnel and continues driving, the vehicle control apparatus may identify an outdoor air temperature using a sensor device (e.g., a sensor device 120 of FIG. 1) at a second time point t22. At this time, a first error d1 between the outdoor air temperature identified by the vehicle control apparatus and an actual temperature in the tunnel may be generated.

For example, while the host vehicle 201 enters the tunnel and continues driving, the vehicle control apparatus may identify an outdoor air temperature using the sensor device at a third time point t23. At this time, a second error d2 between the outdoor air temperature identified by the vehicle control apparatus and the actual temperature in the tunnel may be generated.

Due to the first error d1, the vehicle control apparatus may determine that the outdoor air temperature is smaller than the actual temperature in the tunnel and may operate (or reinforce) a heating function. Furthermore, due to the second error d2, the vehicle control apparatus may determine that the outdoor air temperature is greater than the actual temperature in the tunnel and may not operate (or weaken) the heating function. Due to such errors, a user may experience an uncomfortable feeling of air conditioning.

Figure 3:
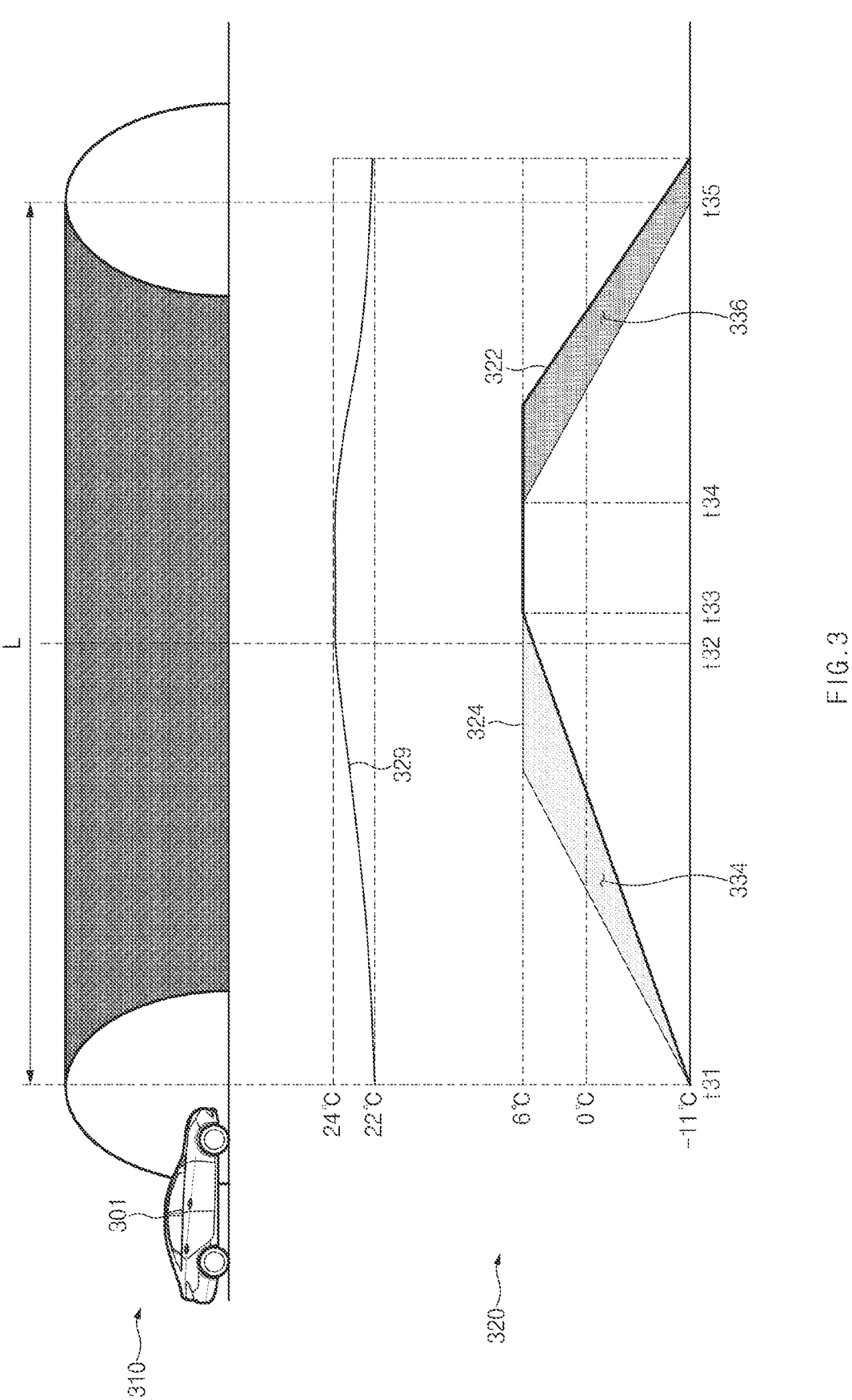
FIG. 3 is an operational conceptual diagram of a vehicle control method according to an embodiment of the present disclosure.

FIG. 3 is an operational conceptual diagram of a vehicle control method according to an embodiment of the present disclosure.

According to an embodiment, a vehicle control apparatus (e.g., a vehicle control apparatus 100 of FIG. 1) may control an air conditioning device (e.g., an air conditioning device 110 of FIG. 1) based on external information (e.g., an outdoor air temperature) of a host vehicle 301.

Referring to reference numerals 310 and 320, according to an embodiment, the host vehicle 301 may enter a tunnel at a first time point t31. The tunnel may have a first length L. The vehicle control apparatus may identify an estimated time taken for the host vehicle 301 to pass through the tunnel, based on at least one of the first length L of the tunnel, a driving speed of the host vehicle 301, driving acceleration of the host vehicle 301, traffic volume, or any combination thereof.

For example, reference numeral 322 is a graph illustrating an outdoor air temperature obtained using the sensor device by the vehicle control apparatus, and reference numeral 324 may be a graph illustrating an actual temperature in the tunnel.

For example, while the host vehicle 301 enters the tunnel and continues driving, the vehicle control apparatus may identify an outdoor air temperature using a sensor device (e.g., a sensor device 120 of FIG. 1) at a second time point t32. An error may still occur between the outdoor air temperature identified by the vehicle control apparatus and an actual temperature in the tunnel at the second time point t32.

For example, while the host vehicle 301 enters the tunnel and continues driving, the vehicle control apparatus may identify that there is no error or a minimum value between the outdoor air temperature identified by the vehicle control apparatus and the actual temperature in the tunnel at a third time point t33.

In this case, an excessive heating section in which an unnecessary heating function is activated may be generated by a size of a first area 334 indicating the error occurring from the first time point t31 to the third time point t33.

For example, while the host vehicle 301 enters the tunnel and continues driving, the vehicle control apparatus may identify an outdoor air temperature using the sensor device at a fourth time point t34. At the fourth time point t34, an error may not occur yet between the outdoor air temperature identified by the vehicle control apparatus and the actual temperature in the tunnel or may be maintained as a minimum value.

For example, while the host vehicle 301 enters the tunnel and continues driving, an error between the outdoor air temperature identified by the vehicle control apparatus and the actual temperature in the tunnel may occur during a section from the fourth time point t34 to a fifth time point t35.

In this case, an underheating section in which a necessary heating function is not activated may be generated by a size of a second area 336 indicating the error occurring from the fourth time point t34 to the fifth time point t35.

Reference numeral 329 may be a graph illustrating an indoor temperature of the host vehicle 301. For example, referring to reference numeral 329, due to the excessive heating section from the first time point t31 to the third time point t33, the vehicle control apparatus may control the indoor temperature of the host vehicle 301 to be greater than a setting temperature (e.g., 22 degrees) set by a user using the air conditioning device.

Figure 4:
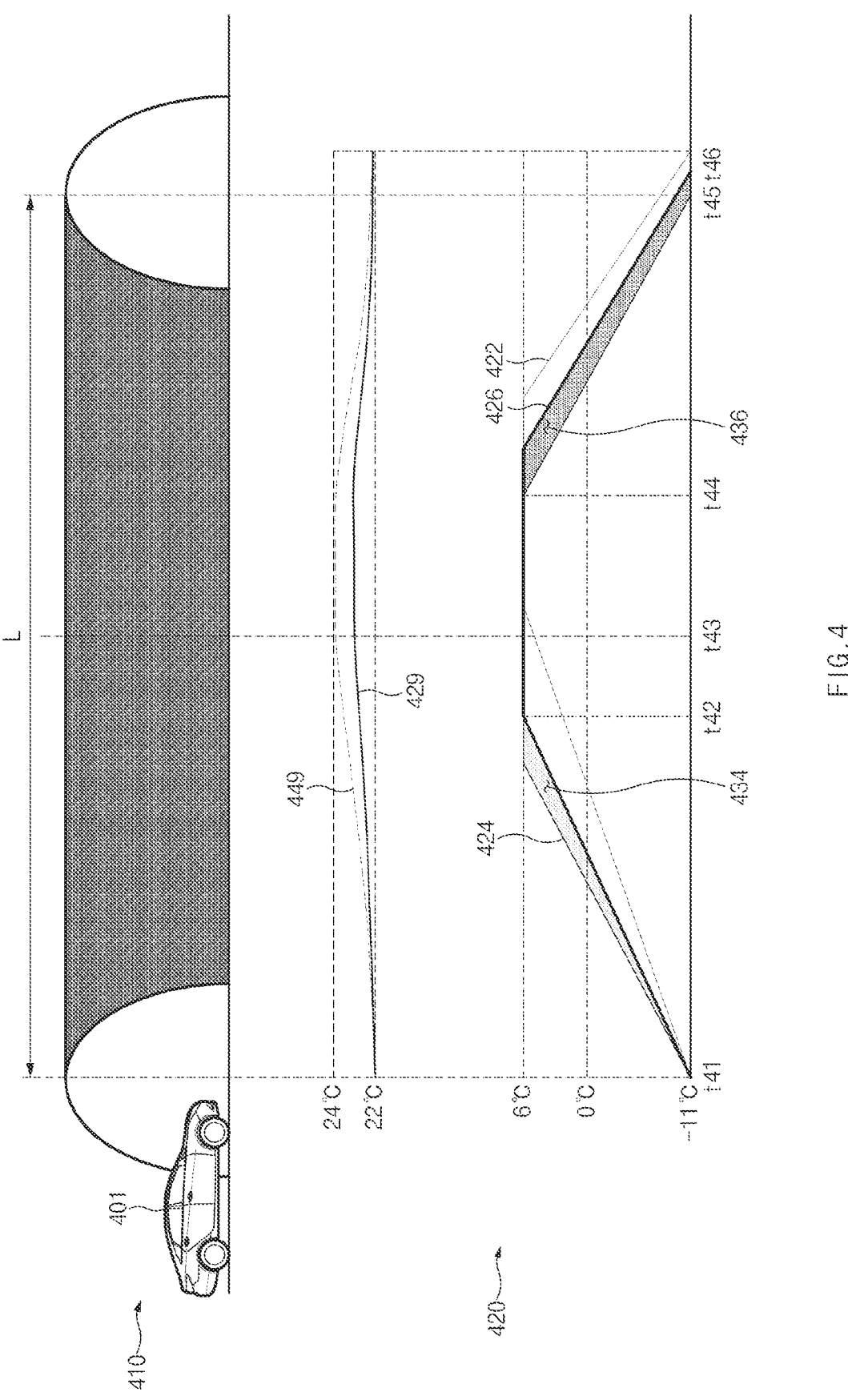
FIG. 4 is an operational conceptual diagram of a vehicle control method according to an embodiment of the present disclosure.

FIG. 4 is an operational conceptual diagram of a vehicle control method according to an embodiment of the present disclosure.

According to an embodiment, a vehicle control apparatus (e.g., a vehicle control apparatus 100 of FIG. 1) may control an air conditioning device (e.g., an air conditioning device 110 of FIG. 1) based on external information (e.g., an outdoor air temperature) of a host vehicle 401.

Referring to reference numerals 410 and 420, according to an embodiment, the host vehicle 401 may enter a tunnel at a first time point t41. The tunnel may have a first length L. The vehicle control apparatus may identify an estimated time taken for the host vehicle 401 to pass through the tunnel, based on at least one of the first length L of the tunnel, a driving speed of the host vehicle 401, driving acceleration of the host vehicle 401, traffic volume, or any combination thereof.

For example, reference numeral 422 is a graph illustrating an outdoor air temperature obtained using a sensor device before the vehicle control apparatus performs sensor data correction logic according to an embodiment of the present disclosure, reference numeral 424 is a graph illustrating an actual temperature in the tunnel, and reference numeral 426 is a graph illustrating an outdoor air temperature obtained by applying sensor data correction logic according to an embodiment of the present disclosure by the vehicle control apparatus.

For example, while the host vehicle 401 enters the tunnel and continues driving, the vehicle control apparatus may identify an outdoor air temperature using a sensor device (e.g., a sensor device 120 of FIG. 1) at a second time point t42. At the second time point t42, it may be identified that the outdoor air temperature identified after applying the sensor data correction logic more accurately follows an actual internal temperature of the tunnel than the outdoor air temperature identified before applying the sensor data correction logic.

For example, while the host vehicle 401 enters the tunnel and continues driving, the vehicle control apparatus may identify that there is no error or a minimum value between the outdoor air temperature identified by the vehicle control apparatus and the actual temperature in the tunnel at a third time point t43. The third time point t43 may be, for example, a time point at which the host vehicle 401 passes through a middle point of the tunnel.

In this case, a third area 434 indicating an error occurring from the first time point t41 to the second time point t42 may be smaller in size than an area (e.g., a first area 334 of FIG. 3) before applying the sensor data correction logic. In other words, in this section, the vehicle control apparatus may more increase an operation parameter (e.g., sensitivity, a change speed, or the like) of the sensor device to more accurately follow an amount of change in outdoor air temperature in real time, thus minimizing or reducing a problem in which an unnecessary heating function is activated.

For example, while the host vehicle 401 enters the tunnel and continues driving, the vehicle control apparatus may identify an outdoor air temperature using the sensor device at a fourth time point t44. At the fourth time point t44, an error may not occur yet between the outdoor air temperature identified by the vehicle control apparatus and the actual temperature in the tunnel or may be maintained as a minimum value.

For example, while the host vehicle 401 enters the tunnel and continues driving, an error between the outdoor air temperature identified by the vehicle control apparatus and the actual temperature in the tunnel may occur during a section from the fourth time point t44 to a sixth time point t46 through a fifth time point t45. The fifth time point t45 may be a time point at which the host vehicle 401 passes through the tunnel.

In this case, a fourth area 436 indicating an error occurring from the fourth time point t44 to the sixth time point t46 may be smaller area (e.g., a second area 336 of FIG. 4) in size than an area before applying the sensor data correction logic. In other words, in this section, the vehicle control apparatus may more increase an operation parameter (e.g., sensitivity, a change speed, or the like) of the sensor device to more accurately follow an amount of change in outdoor air temperature in real time, thus minimizing or reducing a problem in which an unnecessary heating function is activated.

Reference numeral 429 is a graph illustrating an indoor temperature of the host vehicle 401 after applying the sensor data correction logic, and reference numeral 449 may be a graph illustrating an indoor temperature of the host vehicle 401 before applying the sensor data correction logic. As shown, the vehicle control apparatus may apply the sensor data correction logic to control the indoor temperature of the host vehicle 401 using the air conditioning device to be closer to a temperature (e.g., 22 degrees) set by a user.

According to an embodiment, the vehicle control apparatus may apply and add a rate to each of pieces of sensor data to identify a correction value of the outdoor air temperature.

For example, during a section identified that the outdoor air temperature is increasing (e.g., a section from the first time point t41 to the second time point t42), the vehicle control apparatus may update sensor data about the outdoor air temperature every first time based on the outdoor air temperature correction value obtained by using (or adding)

a first rate (e.g., 15-a/16) of N−1st data about the outdoor air temperature and a specified second rate (e.g., 1+a/16) of Nth data.

For example, during a section identified that the outdoor air temperature is decreasing (e.g., a section from the fourth time point t44 to the sixth time point t46), the vehicle control apparatus may use (or add) the first rate (e.g., 15-a/16) of the N−1st data about the outdoor air temperature and the specified second rate (e.g., 1+a/16) of the Nth data and may update the sensor data about the outdoor air temperature every second time smaller than the first time.

In other words, when the outdoor air temperature is decreasing, the vehicle control apparatus may set sensitivity of the sensor device to be higher and may control to obtain data about the outdoor air temperature.

For example, the vehicle control apparatus may increase an "a" value to more increase the sensitivity of the sensor device.

Furthermore, for example, when identifying that the driving speed is greater than or equal to a specified speed continuously during a specified time and when the outdoor air temperature is increasing, the vehicle control apparatus may decrease a sampling rate about the outdoor air temperature.

Figure 5:
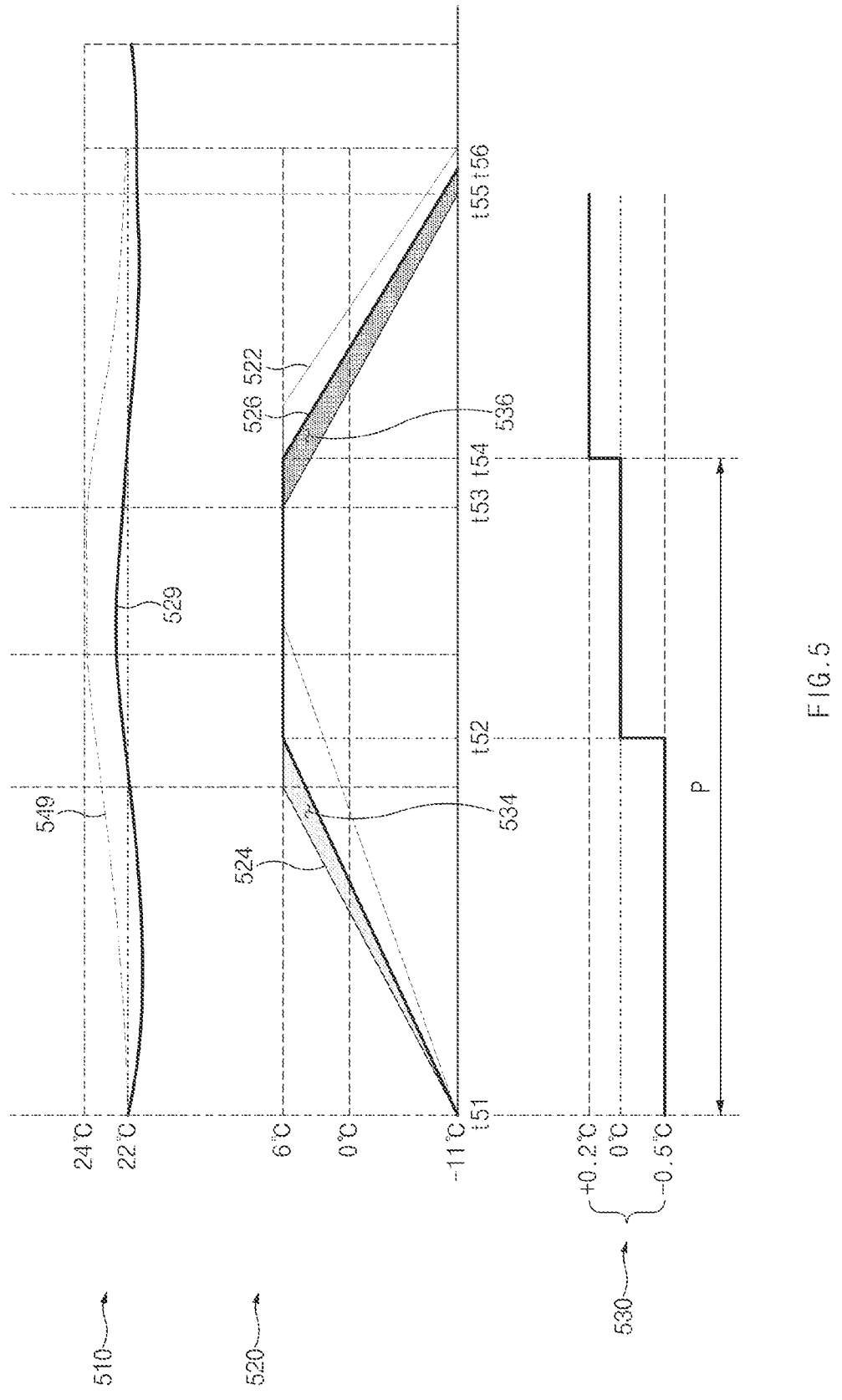
FIG. 5 is an operational conceptual diagram of a vehicle control method according to an embodiment of the present disclosure.

FIG. 5 is an operational conceptual diagram of a vehicle control method according to an embodiment of the present disclosure.

According to an embodiment, a vehicle control apparatus (e.g., a vehicle control apparatus 100 of FIG. 1) may control an air conditioning device (e.g., an air conditioning device 110 of FIG. 1) based on external information (e.g., an outdoor air temperature) of a host vehicle.

Referring to reference numerals 510, 520, and 530, according to an embodiment, the host vehicle may enter a tunnel at a first time point t51. The vehicle control apparatus may identify an estimated time taken for the host vehicle to pass through the tunnel, based on at least one of a length of the tunnel, a driving speed of the host vehicle, driving acceleration of the host vehicle, traffic volume, or any combination thereof.

For example, reference numeral 522 is a graph illustrating an outdoor air temperature obtained using a sensor device before the vehicle control apparatus performs sensor data correction logic according to an embodiment of the present disclosure, reference numeral 524 is a graph illustrating an actual temperature in the tunnel, and reference numeral 526 is a graph illustrating an outdoor air temperature obtained by applying the sensor data correction logic according to an embodiment of the present disclosure by the vehicle control apparatus.

For example, while the host vehicle enters the tunnel and continues driving, the vehicle control apparatus may identify an outdoor air temperature using a sensor device (e.g., a sensor device 120 of FIG. 1) at a second time point t52. At the second time point t52, it may be identified that the outdoor air temperature identified after applying the sensor data correction logic more accurately follows an actual internal temperature of the tunnel than the outdoor air temperature identified before applying the sensor data correction logic.

For example, while the host vehicle enters the tunnel and continues driving, the vehicle control apparatus may identify that there is no error or a minimum value between the outdoor air temperature identified by the vehicle control apparatus and the actual temperature in the tunnel at a third time point t53.

In this case, a fifth area 534 indicating an error occurring from the first time point t51 to the second time point t52 may be smaller in size than an area (e.g., a first area 334 of FIG. 3) before applying the sensor data correction logic. In other words, in this section, the vehicle control apparatus may more increase an operation parameter (e.g., sensitivity, a change speed, or the like) of the sensor device to more accurately follow an amount of change in outdoor air temperature in real time, thus minimizing a problem in which an unnecessary heating function is activated.

For example, while the host vehicle enters the tunnel and continues driving, the vehicle control apparatus may identify an outdoor air temperature using the sensor device at a third time point t53. At the third time point t53, an error may not occur yet between the outdoor air temperature identified by the vehicle control apparatus and the actual temperature in the tunnel or may be maintained as a minimum value.

For example, while the host vehicle enters the tunnel and continues driving, an error between the outdoor air temperature identified by the vehicle control apparatus and the actual temperature in the tunnel may occur during a section from the third time point t53 to a sixth time point t56 through a fourth time point t54 and a fifth time point t55. For example, the fourth time point t54 may be defined as a time point at which the actual temperature in the tunnel starts to decrease.

In this case, a sixth area 536 indicating an error occurring from the third time point t53 to the sixth time point t56 may be smaller in size than an area (e.g., a second area 336 of FIG. 3) before applying the sensor data correction logic. In other words, in this section, the vehicle control apparatus may more increase an operation parameter (e.g., sensitivity, a change speed, or the like) of the sensor device to more accurately follow an amount of change in outdoor air temperature in real time, thus minimizing a problem in which an unnecessary heating function is activated.

Reference numeral 529 is a graph illustrating an indoor temperature of the host vehicle after applying the sensor data correction logic, and reference numeral 549 may be a graph illustrating an indoor temperature of the host vehicle before applying the sensor data correction logic. As shown, the vehicle control apparatus may apply the sensor data correction logic to control the indoor temperature of the host vehicle using the air conditioning device to be closer to a temperature (e.g., 22 degrees) set by a user.

Referring to reference numeral 530, according to an embodiment, the vehicle control apparatus may adjust an indoor temperature setting value of the host vehicle based on a sign of the error, depending on the driving mode of the host vehicle, and may operate at least one algorithm about a heat pump function.

For example, when identifying that the driving mode is a first mode (e.g., an eco mode), the vehicle control apparatus may adjust a setting temperature based on a difference in magnitude between the actual temperature in the tunnel and the outdoor air temperature correction value identified using the sensor device.

As an example, the vehicle control apparatus may identify that the actual temperature in the tunnel is greater than the identified outdoor air temperature correction value, during a section from the first time point t51 to the second time point t52, and may decrease a setting temperature by a first value (e.g., −0.5).

As an example, the vehicle control apparatus may identify that the actual temperature in the tunnel is smaller than the identified outdoor air temperature correction value, during a section from the fourth time point t54 to the sixth time point t56, and may increase the setting temperature by the first value (e.g., 0.2).

For example, when identifying that the driving mode is a second mode (e.g., a heating mode) and when the outdoor air temperature is increasing or in equilibrium, the vehicle control apparatus may decrease an amount of control for operating a heater included in the air conditioning device and may increase an amount of control for operating a heat pump function for absorbing heat outside the host vehicle.

For example, during a section in which the outdoor air temperature is increasing (e.g., a section from the first time point t51 to the second time point t52) and a section in which the outdoor air temperature is in equilibrium (e.g., a section from the second time point t52 to the fourth time point t54), the vehicle control apparatus may activate (or reinforce) an operation of the heat pump function for absorbing (or collecting) heat outside (or in the tunnel) and may decrease an amount of control for operating a heater function which uses the air conditioning device, thus efficiently using power.

Figure 6:
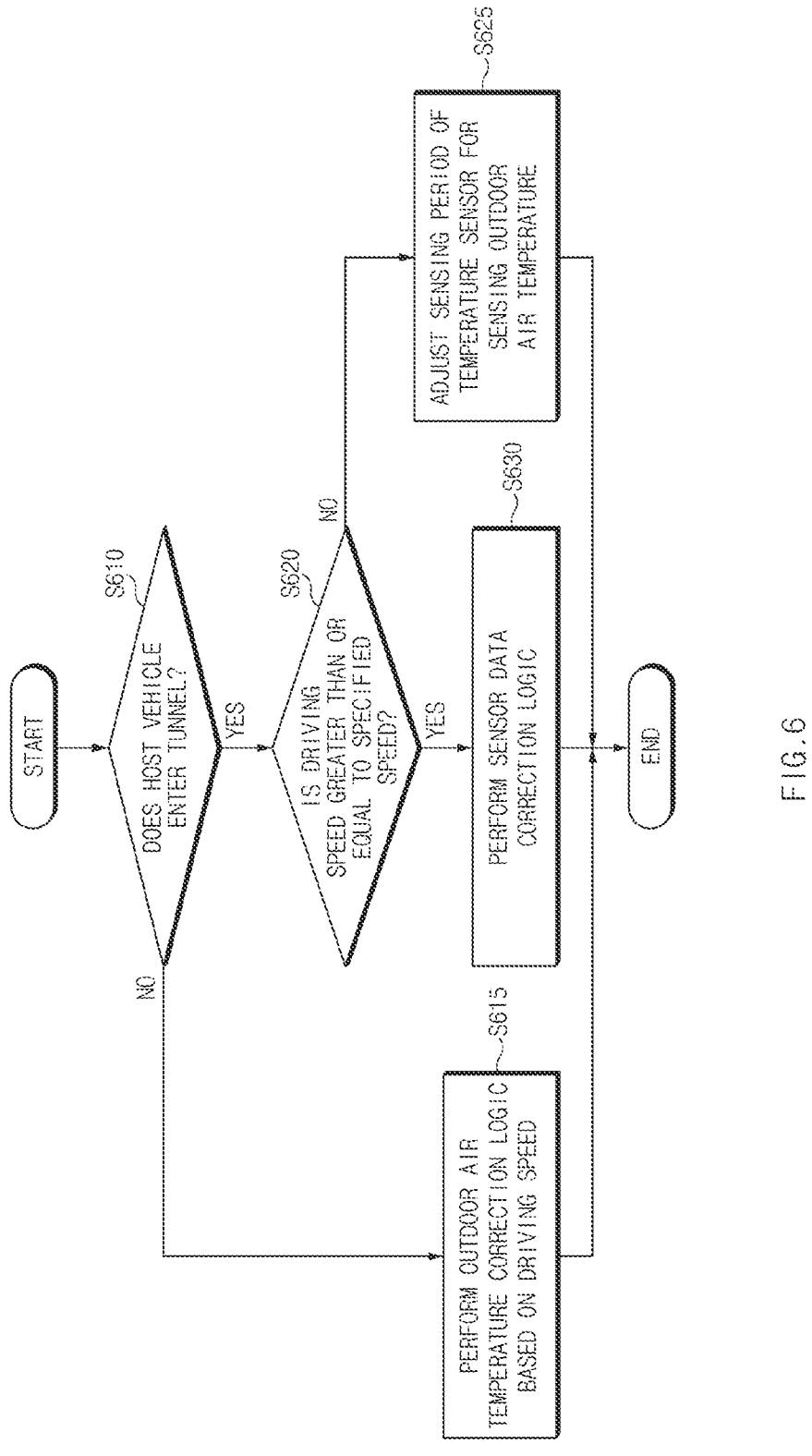
FIG. 6 is a flowchart of a vehicle control method according to an embodiment of the present disclosure.

FIG. 6 is a flowchart of a vehicle control method according to an embodiment of the present disclosure.

According to an embodiment, a vehicle control apparatus (e.g., a vehicle control apparatus 100 of FIG. 1) may perform operations disclosed in FIG. 6. For example, at least some of components (e.g., an air conditioning device 110 of FIG. 1, a sensor device 120 of FIG. 1, a memory 130 of FIG. 1, a controller 140 of FIG. 1, navigation 150 of FIG. 1, or any combination thereof) included in the vehicle control apparatus may be configured to perform the operations of FIG. 6.

Operations S610 to S630 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 6, may be briefly described or omitted.

According to an embodiment, at operation S610, the vehicle control apparatus may identify whether a host vehicle enters a tunnel.

For example, when the host vehicle enters the tunnel (e.g., YES at operation S610), the vehicle control apparatus may perform operation S620.

For example, when the host vehicle does not enter the tunnel (e.g., NO at operation S610), the vehicle control apparatus may perform operation S615.

According to an embodiment, at operation S620, the vehicle control apparatus may perform outdoor air temperature correction logic based on a driving speed (or the driving speed and an amount of change in outdoor air temperature).

For example, the description of the outdoor air temperature correction logic according to operation S615 may be replaced with a description of outdoor air temperature correction logic according to operation S825, which will be described below.

According to an embodiment, at operation S620, the vehicle control apparatus may determine whether the driving speed is greater than or equal to a specified speed.

For example, when the driving speed is greater than or equal to the specified speed (e.g., YES at operation S620), the autonomous driving control apparatus may perform operation S630.

For example, when the driving speed is less than the specified speed (e.g., NO at operation S620), the autonomous driving control apparatus may perform operation S625.

According to an embodiment, at operation S630, the vehicle control apparatus may perform sensor data correction logic.

For example, when identifying that the host vehicle is driving at the specified speed or more in the situation in which the host vehicle enters the tunnel, the vehicle control apparatus may perform the sensor data correction logic.

For example, the vehicle control apparatus may update sensor data about an outdoor air temperature in units of a specified time, using a first rate (e.g., 15-a/16) of N−1st data about the outdoor air temperature and a specified second rate (e.g., 1+a/16) of Nth data. For example, the vehicle control apparatus may update sensor data about the outdoor air temperature every first time, using the first rate (e.g., 15-a/16) of the N−1st data about the outdoor air temperature and the specified second rate (e.g., 1+a/16) of Nth data, when identifying that the outdoor air temperature is increasing, and may update the sensor data about the outdoor air temperature every first time, using the first rate (e.g., 15-a/16) of the N−1st data about the outdoor air temperature and the specified second rate (e.g., 1+a/16) of the Nth data, when identifying that the outdoor air temperature is decreasing. In other words, when the outdoor air temperature is decreasing, the vehicle control apparatus may set sensitivity of the sensor device to be higher and may control to obtain data about the outdoor air temperature. For example, the vehicle control apparatus may increase an "a" value to more increase the sensitivity of the sensor device. Furthermore, for example, when identifying that the driving speed is greater than or equal to a specified speed continuously during a specified time and when the outdoor air temperature is increasing, the vehicle control apparatus may decrease a sampling rate about the outdoor air temperature.

According to an embodiment, at operation S630, the vehicle control apparatus may adjust a sensing period of the temperature sensor that senses the outside air temperature.

For example, when identifying that the host vehicle is driving at less than the specified speed in the situation in which the host vehicle enters the tunnel, the vehicle control apparatus may adjust the sensing period of an outdoor air temperature sensor which senses the outdoor air temperature.

As an example, when the driving speed is less than the specified speed, the vehicle control apparatus may identify an outdoor air temperature correction value for controlling the air conditioning device based on a third slope corresponding to an increasing speed of the outdoor air temperature, when the outdoor air temperature is increasing, and may identify an outdoor air temperature correction value for controlling the air conditioning device based on a fourth slope corresponding to a decreasing speed of the outdoor air temperature, when the outdoor air temperature is decreasing.

An algorithm for describing operations S625 and S630 of FIG. 6, which are described above, may be defined as an algorithm included in the sensor data correction logic.

Figure 7:
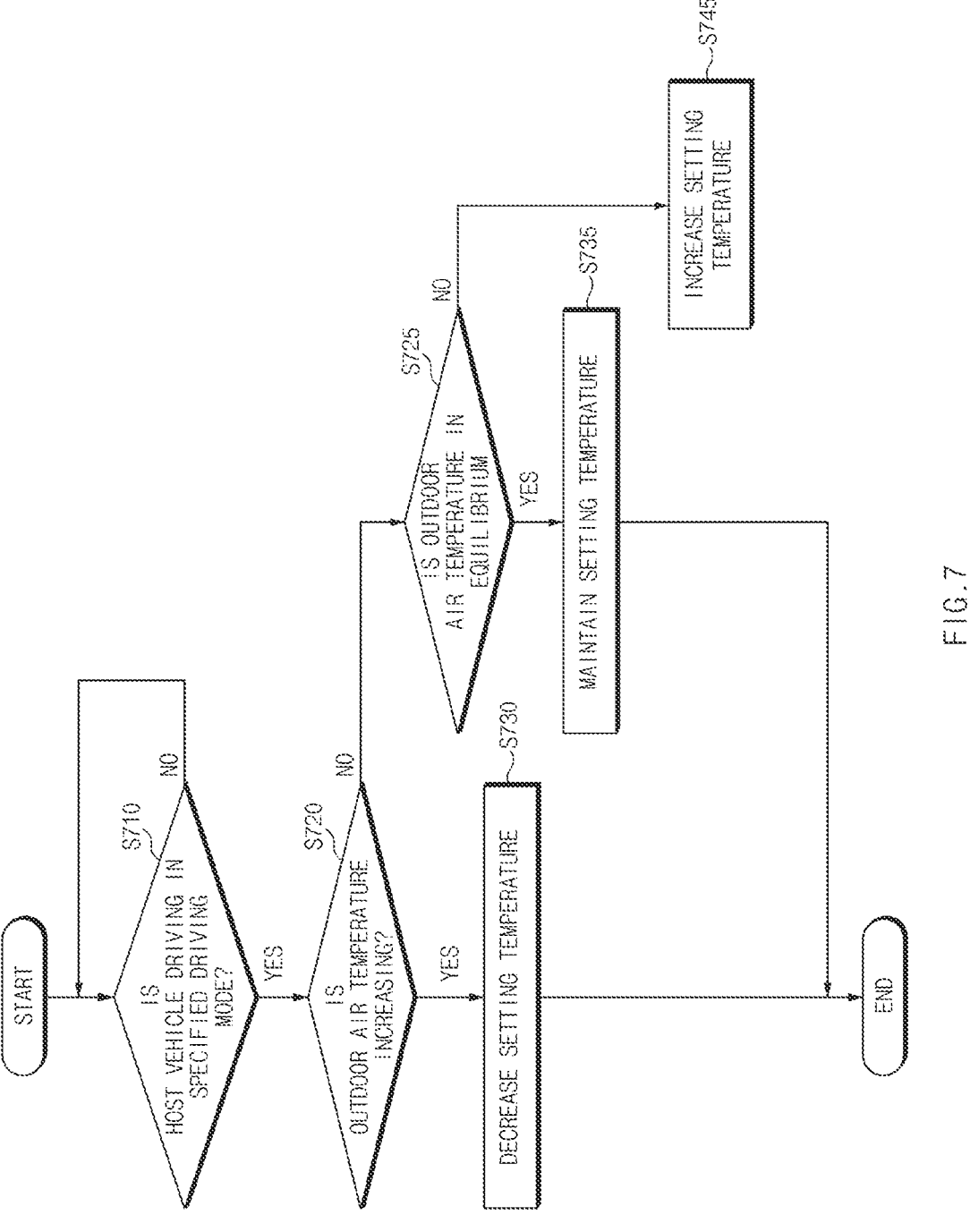
FIG. 7 is a flowchart of a vehicle control method according to an embodiment of the present disclosure.

FIG. 7 is a flowchart of a vehicle control method according to an embodiment of the present disclosure.

According to an embodiment, a vehicle control apparatus (e.g., a vehicle control apparatus 100 of FIG. 1) may perform operations disclosed in FIG. 7. For example, at least some of components (e.g., an air conditioning device 110 of FIG. 1, a sensor device 120 of FIG. 1, a memory 130 of FIG. 1, a controller 140 of FIG. 1, navigation 150 of FIG. 1, or any combination thereof) included in the vehicle control apparatus may be configured to perform the operations of FIG. 7.

Operations S710 to S745 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 7, may be briefly described or omitted.

According to an embodiment, at operation S710, the vehicle control apparatus may identify whether a host vehicle is driving in a specified driving mode.

For example, when the host vehicle is driving in the specified driving mode (e.g., an eco mode) (e.g., YES at operation S710), the vehicle control apparatus may perform operation S720.

For example, when the host vehicle is not driving in the specified driving mode (e.g., the eco mode) (e.g., NO at operation S710), the vehicle control apparatus may repeatedly perform operation S710.

According to an embodiment, at operation S720, the vehicle control apparatus may identify whether an outdoor air temperature is increasing.

For example, when the outdoor air temperature is increasing (e.g., YES at operation S720), the vehicle control apparatus may perform operation S730.

For example, when the outdoor air temperature is not increasing (e.g., NO at operation S720), the vehicle control apparatus may perform operation S725.

According to an embodiment, at operation S730, the vehicle control apparatus may decrease a setting temperature.

For example, the vehicle control apparatus may decrease the setting temperature, which is one of operation parameters that are a criterion for controlling the air conditioning device, thus preventing an unnecessary air conditioning function from being activated in the situation in which the outdoor air temperature is increasing.

According to an embodiment, at operation S725, the vehicle control apparatus may identify whether the outdoor air temperature is in equilibrium.

For example, when the outdoor air temperature is in equilibrium (e.g., YES at operation S725), the vehicle control apparatus may perform operation S735.

For example, when the outdoor air temperature is not in equilibrium (e.g., NO at operation S725) (or when the outdoor air temperature is decreasing), the vehicle control apparatus may perform operation S745.

According to an embodiment, at operation S735, the vehicle control apparatus may maintain the setting temperature.

According to an embodiment, at operation S745, the vehicle control apparatus may increase the setting temperature.

For example, the vehicle control apparatus may increase the setting temperature, which is one of operation parameters that are a criterion for controlling the air conditioning device, thus preventing a problem in which a necessary air conditioning function is not activated in the situation in which the outdoor air temperature is decreasing.

FIG. 8 is a flowchart of a vehicle control method according to an embodiment of the present disclosure.

According to an embodiment, a vehicle control apparatus (e.g., a vehicle control apparatus 100 of FIG. 1) may perform operations disclosed in FIG. 8. For example, at least some of components (e.g., an air conditioning device 110 of FIG. 1, a sensor device 120 of FIG. 1, a memory 130 of FIG. 1, a controller 140 of FIG. 1, navigation 150 of FIG. 1, or any combination thereof) included in the vehicle control apparatus may be configured to perform the operations of FIG. 8.

Operations S810 to S830 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 8, may be briefly described or omitted.

According to an embodiment, at operation S810, the vehicle control apparatus may identify a driving position of a host vehicle and an outdoor air temperature of the host vehicle.

According to an embodiment, at operation S820, the vehicle control apparatus may identify whether the host vehicle enters a tunnel.

For example, the vehicle control apparatus may identify whether the host vehicle enters the tunnel, based on the driving position identified using a sensor device (and/or navigation).

For example, when the host vehicle enters the tunnel (e.g., YES at operation S820), the vehicle control apparatus may perform operation S830.

For example, when the host vehicle does not enter the tunnel (e.g., NO at operation S820) (or when the host vehicle is driving out of the tunnel), the vehicle control apparatus may perform operation S825.

According to an embodiment, at operation S825, the vehicle control apparatus may perform outdoor air temperature correction logic based on a driving speed (or the driving speed and an amount of change in outdoor air temperature).

For example, when identifying that the host vehicle drives out of the tunnel based on the driving position, the vehicle control apparatus may identify whether the identified driving speed is greater than or equal to a specified speed. At this time, the vehicle control may set sensitivity of the sensor device to a first degree and may update sensing data for the outdoor air temperature every first time, when the outdoor air temperature is increasing, and may set the sensitivity to the first degree and may update the sensing data for the outdoor air temperature every second time smaller than the first time, when the outdoor air temperature is decreasing.

For example, when identifying that the host vehicle drives out of the tunnel based on the driving position, the vehicle control apparatus may identify whether the identified driving speed is greater than or equal to the specified speed and may identify that the driving speed is less than the specified speed. At this time, the vehicle control apparatus may identify an outdoor air temperature correction value for controlling the air conditioning device based on a first slope corresponding to an increasing speed of the outdoor air temperature, when the outdoor air temperature is increasing, and may identify an outdoor air temperature correction value for controlling the air conditioning device based on a second slope corresponding to a decreasing speed of the outdoor air temperature, when the outdoor air temperature is decreasing. For example, an absolute value of the first slope may be set to be smaller than an absolute value of the second slope.

According to an embodiment, at operation S830, the vehicle control apparatus may perform sensor data correction logic based on at least one of a driving speed, an amount of change in outdoor air temperature, or a driving mode, or any combination thereof.

For example, the sensor data correction logic may include an algorithm for setting an operation parameter (or sensitivity) for operating the sensor device in the outdoor air temperature correction logic according to operation S825 to be higher.

As an example, when identifying that the host vehicle enters the tunnel based on the driving position, the vehicle control apparatus may identify whether the identified driving speed is greater than or equal to a specified speed. For example, when the driving speed is greater than or equal to the specified speed, the vehicle control apparatus may set sensitivity of the sensor device to a second degree greater than the first degree and may update sensing data for the outdoor air temperature every first time, when the outdoor air temperature is increasing, and may set the sensitivity to the second degree and may update the sensing data for the outdoor air temperature every second time smaller than the first time, when the outdoor air temperature is decreasing. For example, when the driving speed is less than the specified speed, the vehicle control apparatus may identify an outdoor air temperature correction value for controlling the air conditioning device based on a third slope corresponding to an increasing speed of the outdoor air temperature, when the outdoor air temperature is increasing, and may identify an outdoor air temperature correction value for controlling the air conditioning device based on a fourth slope corresponding to a decreasing speed of the outdoor air temperature, when the outdoor air temperature is decreasing. In this case, an absolute value of the third slope may be set to be greater than an absolute value of the first slope, and an absolute value of the fourth slope may be set to be greater than an absolute value of the second slope. In other words, the vehicle control apparatus may obtain larger amounts of data at a fast period based on high sensitivity using the sensor data correction logic according to operation S830 than the outdoor air temperature correction logic according to operation S825, thus performing an accurate or more accurate outdoor air temperature estimation operation.

Figure 9:
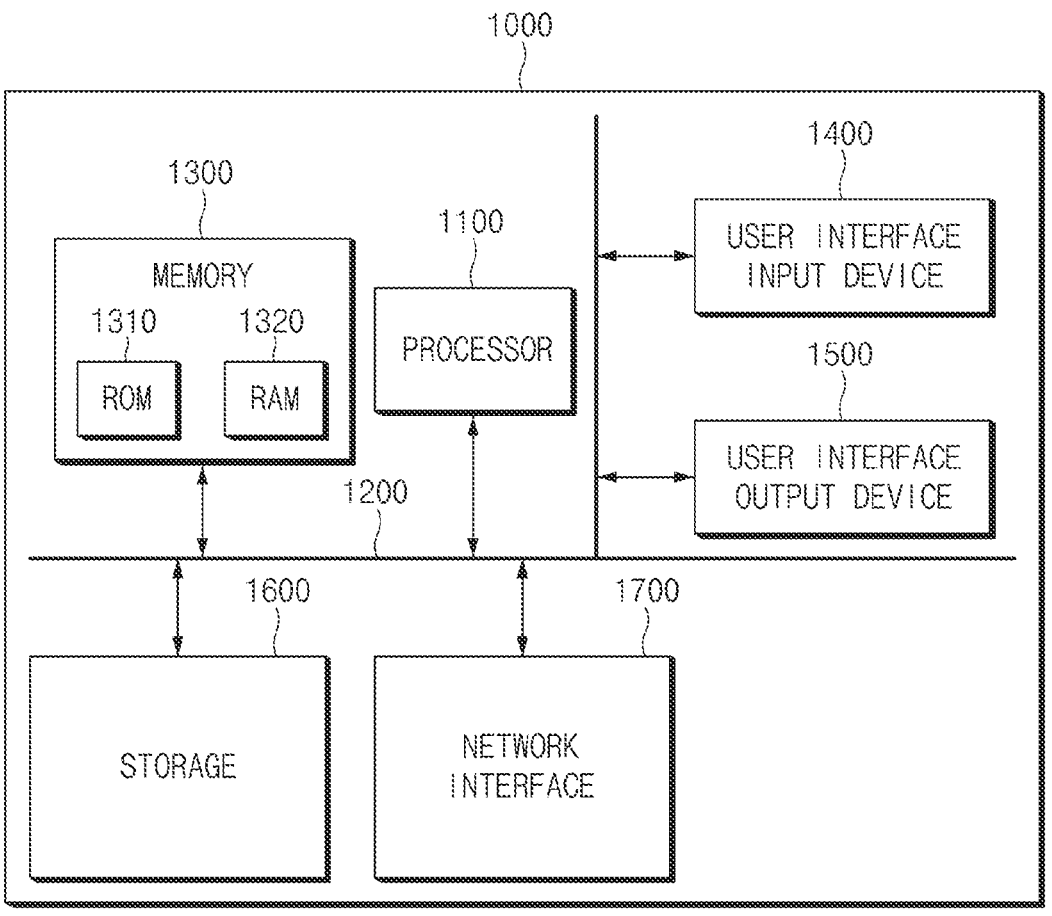
FIG. 9 illustrates a computing system associated with a vehicle control apparatus or a vehicle control method according to an embodiment of the present disclosure.

FIG. 9 illustrates a computing system associated with a vehicle control apparatus or a vehicle control method according to an embodiment of the present disclosure.

Referring to FIG. 9, a computing system 1000 of the vehicle control apparatus or the vehicle control method may include at least one processor 1100, a memory 1300, a user interface input device 1400, a user interface output device 1500, storage 1600, and a network interface 1700, which can be connected with each other via a bus 1200, and any of which may be in plural.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, a CD-ROM, or any combination thereof.

The example storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of advantages of the vehicle control apparatus and the method thereof according to an embodiment of the present disclosure.

The vehicle control apparatus according to embodiments of the present disclosure may identify a driving position of a host vehicle and may perform sensor data correction logic for correcting sensor data for controlling an air conditioning device when identifying that the host vehicle enters a tunnel based on the driving position.

The vehicle control apparatus according to embodiments of the present disclosure may operate a sensor device (or an outdoor air temperature sensor) for sensing an outdoor air temperature based on different sensitivity and/or different sensing periods (or update periods) depending on whether the driving speed of the host vehicle is greater than or equal to a specified speed.

The vehicle control apparatus according to embodiments of the present disclosure may operate a sensor data acquisition algorithm with different criteria, based on whether a temperature of an environment in which the host vehicle is driving (or an outdoor air temperature) is increasing or decreasing.

The vehicle control apparatus according to embodiments of the present disclosure may adjust a control parameter for controlling an air conditioning device (e.g., a setting temperature, an amount of control for operating a heater, or an amount of control for operating a heat pump function), based on a type of the driving mode of the host vehicle, thus providing the user with a more adaptive air conditioning device control function.

In addition, variations ascertained directly or indirectly through the present disclosure may be provided.

Hereinabove, although the present disclosure has been described with reference to example embodiments and the accompanying drawings, the present disclosure is not necessarily limited thereto, but may be variously modified and altered by those skilled in the art to which the present disclosure pertains without departing from the spirit and scope of the present disclosure claimed in the following claims.

Therefore, embodiments of the present disclosure are not intended to necessarily limit the technical spirit of the present disclosure, and are provided for illustrative purposes. The scope of the present disclosure can be construed on the basis of the accompanying claims, and all technical ideas within the scope equivalent to the claims can be included in the scope of the present disclosure.

What is claimed is:

1. A vehicle control apparatus, comprising:
an air conditioning device;
a sensor device;
a memory storing computer-executable code; and
a controller operatively connected with the air conditioning device, the sensor device, and the memory, the controller being configured to execute the code, wherein the code comprises instructions for the controller to cause the vehicle control apparatus to:
identify one or more of a driving position of a host vehicle, a driving mode of the host vehicle, a driving speed of the host vehicle, and an outdoor air temperature of the host vehicle, using the sensor device, identify whether the host vehicle enters a tunnel based on the driving position, and perform sensor data correction logic for controlling the air conditioning device based on one or more of whether the host vehicle enters the tunnel, the driving speed, an amount of change in the outdoor air temperature, and the driving mode of the host vehicle, wherein the controller is configured to:

identify whether the driving speed is greater than or equal to a specified speed in response to identifying that the host vehicle is in the tunnel; and in response to the driving speed being greater than or equal to the specified speed:

(i) update sensing data for the outdoor air temperature at every first time interval in response to the outdoor air temperature increasing, and (ii) update the sensing data for the outdoor air temperature at every second time interval in response to the outdoor air temperature decreasing, wherein the second time interval is shorter than the first time interval.

2. The apparatus of claim 1, wherein the code further comprises instructions for the controller to cause the vehicle control apparatus to:

identify whether the identified driving speed is greater than or equal to a specified speed, in response to identifying that the host vehicle is driving out of the tunnel based on the driving position; and in response to the driving speed being less than the specified speed, identify an outdoor air temperature correction value for controlling the air conditioning device based on a first slope corresponding to an increasing speed of the outdoor air temperature, in response to the outdoor air temperature increasing, and identify the outdoor air temperature correction value for controlling the air conditioning device based on a second slope corresponding to a decreasing speed of the outdoor air temperature, in response to the outdoor air temperature decreasing.

3. The apparatus of claim 2, wherein an absolute value of the first slope is set to be smaller than an absolute value of the second slope.

4. The apparatus of claim 1, wherein the code further comprises instructions for the controller to cause the vehicle control apparatus to:

in response to identifying that the host vehicle enters the tunnel and the driving speed being greater than or equal to the specified speed, set sensitivity of the sensor device to a second degree that is greater than a first degree applied outside the tunnel, and update the sensing data according to the first or second time interval.

5. The apparatus of claim 4, wherein the code further comprises instructions for the controller to cause the vehicle control apparatus to:

in response to the driving speed being greater than or equal to the specified speed continuously during a specified time, increase a sampling rate about the outdoor air temperature, in response to the outdoor air temperature increasing.

6. The apparatus of claim 2, wherein the code further comprises instructions for the controller to cause the vehicle control apparatus to:

identify whether the identified driving speed is greater than or equal to the specified speed, in response to identifying that the host vehicle enters the tunnel based on the driving position; and in response to the driving speed being less than the specified speed, identify the outdoor air temperature correction value for controlling the air conditioning device based on a third slope corresponding to an increasing speed of the outdoor air temperature, in response to the outdoor air temperature increasing, and identify the outdoor air temperature correction value for controlling the air conditioning device based on a fourth slope corresponding to a decreasing speed of the outdoor air temperature, in response to the outdoor air temperature decreasing.

7. The apparatus of claim 6, wherein an absolute value of the third slope is set to be greater than an absolute value of the first slope, and an absolute value of the fourth slope is set to be greater than an absolute value of the second slope.

8. The apparatus of claim 1, wherein the code further comprises instructions for the controller to cause the vehicle control apparatus to:

in response to identifying the driving mode of the host vehicle that corresponds to a first mode:

decrease a setting temperature for controlling the air conditioning device by a first value, in response to the outdoor air temperature increasing, and increase the setting temperature for controlling the air conditioning device by a second value smaller than the first value, in response to the outdoor air temperature decreasing.

9. The apparatus of claim 1, wherein the code further comprises instructions for the controller to cause the vehicle control apparatus to:

in response to identifying the driving mode of the host vehicle that corresponds to a second mode, decrease an amount of control for operating a heater included in the air conditioning device and increase an amount of control for operating a heat pump function for absorbing heat outside the host vehicle, in response to the outdoor air temperature increasing or being in equilibrium.

10. A vehicle control method, comprising:

identifying one or more of a driving position of a host vehicle, a driving mode of the host vehicle, a driving speed of the host vehicle, and an outdoor air temperature of the host vehicle;

identifying whether the host vehicle enters a tunnel based on the driving position; and performing sensor data correction logic for controlling an air conditioning device wherein the performing of the sensor data correction logic comprises:

identifying whether the driving speed is greater than or equal to a specified speed in response to identifying that the host vehicle is in the tunnel; and in response to the driving speed being greater than or equal to the specified speed:

(i) updating sensing data for the outdoor air temperature at every first time interval in response to the outdoor air temperature increasing; and (ii) updating the sensing data for the outdoor air temperature at every second time interval in response to the outdoor air temperature decreasing, wherein the second time interval is shorter than the first time interval.

11. The method of claim 10, wherein the performing of the sensor data correction logic comprises:

identifying whether the identified driving speed is greater than or equal to a specified speed, in response to identifying that the host vehicle is driving out of the tunnel based on the driving position; and in response to the driving speed being less than the specified speed, identifying an outdoor air temperature correction value for controlling the air conditioning device based on a first slope corresponding to an increasing speed of the outdoor air temperature, in response to the outdoor air temperature increasing, and identifying the outdoor air temperature correction value for controlling the air conditioning device based on a second slope corresponding to a decreasing speed of the outdoor air temperature, in response to the outdoor air temperature decreasing.

12. The method of claim 11, wherein an absolute value of the first slope is set to be smaller than an absolute value of the second slope.

13. The method of claim 10, wherein the performing of the sensor data correction logic comprises:

in response to identifying that the host vehicle enters the tunnel and the driving speed being greater than or equal to the specified speed, setting sensitivity of the sensor device to a second degree that is greater than a first degree applied outside the tunnel, and updating the sensing data according to the first or second time interval.

14. The method of claim 13, further comprising:

in response to the driving speed being greater than or equal to the specified speed continuously during a specified time, decreasing a sampling rate about the outdoor air temperature, in response to the outdoor air temperature increasing.

15. The method of claim 11, wherein the performing of the sensor data correction logic comprises:

identifying whether the identified driving speed is greater than or equal to the specified speed, in response to identifying that the host vehicle enters the tunnel based on the driving position; and in response to the driving speed being less than the specified speed, identifying the outdoor air temperature correction value for controlling the air conditioning device based on a third slope corresponding to an increasing speed of the outdoor air temperature, in response to the outdoor air temperature increasing, and identifying the outdoor air temperature correction value for controlling the air conditioning device based on a fourth slope corresponding to a decreasing speed of the outdoor air temperature, in response to the outdoor air temperature decreasing.

16. The method of claim 15, wherein an absolute value of the third slope is set to be greater than an absolute value of the first slope, and an absolute value of the fourth slope is set to be greater than an absolute value of the second slope.

17. The method of claim 10, further comprising:

in response to identifying the driving mode of the host vehicle corresponding to a first mode, decreasing a setting temperature for controlling the air conditioning device by a first value, in response to the outdoor air temperature increasing, and increasing the setting temperature for controlling the air conditioning device by a second value smaller than the first value, in response to the outdoor air temperature decreasing.

18. The method of claim 10, further comprising:

in response to identifying the driving mode of the host vehicle corresponding to a second mode, and decreasing an amount of control for operating a heater included in the air conditioning device and increasing an amount of control for operating a heat pump function for absorbing heat outside the host vehicle, in response to the outdoor air temperature increasing or being in equilibrium.

19. The apparatus of claim 1, wherein the code further comprises instructions for the controller to cause the vehicle control apparatus to:

determine whether the host vehicle enters the tunnel based on one of a distance at which the host vehicle is spaced apart from the tunnel, a length of the tunnel, and an estimated time to pass through the tunnel; and adjust a sampling rate of the sensor device about the outdoor air temperature based on a magnitude between an actual temperature in the tunnel and a temperature outside the tunnel when the outdoor air temperature is increasing.

20. A vehicle control method, comprising:

identifying one or more of a driving position of a host vehicle, a driving mode of the host vehicle, a driving speed of the host vehicle, and an outdoor air temperature of the host vehicle;

identifying whether the host vehicle enters a tunnel based on the driving position;

performing sensor data correction logic for controlling an air conditioning device based on one or more of whether the host vehicle enters the tunnel, the driving speed, an amount of change in the outdoor air temperature, and the driving mode of the host vehicle, wherein the performing of the sensor data correction logic comprises:

identifying whether the driving speed is greater than or equal to a specified speed in response to identifying that the host vehicle is in the tunnel; and in response to the driving speed being greater than or equal to the specified speed:

(i) updating sensing data for the outdoor air temperature at every first time interval in response to the outdoor air temperature increasing; and (ii) updating the sensing data for the outdoor air temperature at every second time interval in response to the outdoor air temperature decreasing, wherein the second time interval is shorter than the first time interval;

adjusting an operation parameter of the air conditioning device based on a difference between an actual temperature in the tunnel and a temperature outside the tunnel; and maintaining a minimum value for the actual temperature in the tunnel when an error occurs between the outdoor air temperature identified by a sensor device and the actual temperature in the tunnel.

* * * * *